(12) United States Patent
Lang et al.

(10) Patent No.: US 11,373,518 B2
(45) Date of Patent: Jun. 28, 2022

(54) METHOD FOR DATA COLLECTION

(71) Applicant: Audi AG, Ingolstadt (DE)

(72) Inventors: Johannes Lang, Poxdorf (DE); Jens Lorenz, Nuremberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/606,994

(22) PCT Filed: Mar. 20, 2018

(86) PCT No.: PCT/EP2018/056959
§ 371 (c)(1),
(2) Date: Oct. 21, 2019

(87) PCT Pub. No.: WO2018/197111
PCT Pub. Date: Nov. 1, 2018

(65) Prior Publication Data
US 2020/0082710 A1    Mar. 12, 2020

(30) Foreign Application Priority Data

Apr. 26, 2017   (DE) ..................... 10 2017 207 014.5

(51) Int. Cl.
*G08G 1/01*   (2006.01)
*G07C 5/00*   (2006.01)
(Continued)

(52) U.S. Cl.
CPC ........... *G08G 1/0112* (2013.01); *G07C 5/008* (2013.01); *G08G 1/017* (2013.01); *G08G 1/20* (2013.01); *H04W 4/38* (2018.02); *H04W 4/44* (2018.02)

(58) Field of Classification Search
USPC ........................................................ 701/117
See application file for complete search history.

(56) References Cited

U.S. PATENT DOCUMENTS 5,987,606 A * 11/1999 Cirasole ................. G06Q 30/06
                                                 726/11
9,298,803 B2 * 3/2016 Wallace ................. G06Q 10/10
(Continued)

FOREIGN PATENT DOCUMENTS

CN      101409726 A    4/2009
CN      105934777 A    9/2016
(Continued)

OTHER PUBLICATIONS

International Search Report and Written Opinion of the International Searching Authority directed to related International Patent Application No. PCT/EP2018/056959, dated Jul. 5, 2018, with attached English-language translation; 20 pages.
(Continued)

*Primary Examiner* — Tyler D Paige
(74) *Attorney, Agent, or Firm* — Sterne, Kessler, Goldstein & Fox P.L.L.C.

(57) ABSTRACT

In a method for data collection by means of a vehicle fleet and a control center, the control center produces data collection tasks for data collection and transmits at least one of the data collection tasks (6) to at least one vehicle in the vehicle fleet, the vehicles in the vehicle fleet being identifiable by means of vehicle attributes. The control center links each data collection task with an objective, wherein the vehicle attributes of the vehicles logged in to the control center are compared with the objectives of the data collection tasks, after which, if the objective of one of the data collection tasks matches the vehicle attributes of one of the vehicles, the corresponding data collection task is transmitted to the corresponding vehicle, after which a data collection device in the vehicle acquires task-specific data and transmits it to the control center.

12 Claims, 1 Drawing Sheet

(51) Int. Cl.
  *G08G 1/017* (2006.01)
  *H04W 4/38* (2018.01)
  *H04W 4/44* (2018.01)
  *G08G 1/00* (2006.01)

(56) References Cited

U.S. PATENT DOCUMENTS

| | | | |
|---|---|---|---|
| 10,062,219 B2 | 8/2018 | Richter et al. | |
| 10,559,201 B1* | 2/2020 | Bauer | G08G 1/08 |
| 10,650,621 B1* | 5/2020 | King | H04L 67/10 |
| 10,719,792 B2* | 7/2020 | Fagnant | G06Q 10/02 |
| 2003/0114965 A1 | 6/2003 | Fiechter et al. | |
| 2004/0039504 A1* | 2/2004 | Coffee | B28C 9/00 |
| | | | 701/482 |
| 2005/0080606 A1* | 4/2005 | Ampunan | G06Q 10/06 |
| | | | 703/8 |
| 2006/0276204 A1* | 12/2006 | Simpson | H04W 99/00 |
| | | | 455/456.5 |
| 2008/0024323 A1* | 1/2008 | Kadaba | G01N 33/0075 |
| | | | 340/905 |
| 2008/0154691 A1 | 6/2008 | Wellman et al. | |
| 2009/0288091 A1* | 11/2009 | Papadakos | G06F 9/5011 |
| | | | 718/104 |
| 2012/0116678 A1* | 5/2012 | Witmer | G06F 16/29 |
| | | | 702/5 |
| 2014/0149416 A1* | 5/2014 | Wallace | G06Q 10/10 |
| | | | 707/737 |
| 2015/0094903 A1 | 4/2015 | Bell | |
| 2015/0094929 A1 | 4/2015 | Bell | |
| 2016/0055685 A1* | 2/2016 | Lilly | G07C 5/0825 |
| | | | 701/1 |
| 2017/0124779 A1 | 5/2017 | Westendorf et al. | |
| 2017/0132853 A1* | 5/2017 | Matos | H04W 48/20 |
| 2017/0166163 A1 | 6/2017 | Poma | |
| 2018/0192270 A1* | 7/2018 | Schmitz | G08G 1/0145 |
| 2018/0232707 A1* | 8/2018 | Angai | G06Q 10/20 |
| 2019/0196503 A1* | 6/2019 | Abari | G06Q 10/00 |
| 2019/0227569 A1* | 7/2019 | Weslosky | G07C 5/008 |
| 2019/0278298 A1* | 9/2019 | Pedersen | G05D 1/0297 |
| 2020/0082710 A1* | 3/2020 | Lang | G08G 1/20 |

FOREIGN PATENT DOCUMENTS

| | | |
|---|---|---|
| CN | 106488864 A | 3/2017 |
| DE | 195 13 640 A1 | 6/1996 |
| DE | 10014365 A1 | 9/2001 |
| DE | 102 35 525 A1 | 4/2003 |
| DE | 10 2004 012 143 B3 | 9/2005 |
| DE | 10 2011 009 812 B3 | 5/2012 |
| DE | 10 2014 219 226 A1 | 4/2015 |
| DE | 10 2014 219 232 A1 | 4/2015 |
| DE | 10 2015 205 094 A1 | 9/2016 |
| DE | 10 2015 214 739 A1 | 2/2017 |
| DE | 10 2015 218 262 A1 | 3/2017 |
| EP | 1 146 495 A2 | 10/2001 |

OTHER PUBLICATIONS

Written Opinion of the International Preliminary Examining Authority directed to related International Patent Application No. PCT/EP2018/056959, dated May 2, 2019, with attached English-language translation; 12 pages.

International Preliminary Report on Patentability directed to related International Patent Application No. PCT/EP2018/056959, completed Aug. 26, 2019, with attached English-language translation; 11 pages.

* cited by examiner

METHOD FOR DATA COLLECTION

TECHNICAL FIELD

The present disclosure relates to a method and a system for data collection by means of a vehicle fleet and a control center, wherein the control center produces data collection tasks for data collection relating to the driving dynamics of the vehicle among other things.

BACKGROUND

From practice it is known to use vehicles of a vehicle fleet to collect data relevant for road traffic information and to monitor the vehicle fleet itself. Reference is made, for example, to DE 10 2015 205 094 A1, which discloses an automatic detection and evaluation of objects, such as traffic signs, in particular by a vehicle fleet, as well as a subsequent central analysis of this classification. As a result, the state of traffic signs along a traffic network can be monitored and evaluated. Dirty and damaged traffic signs can be detected quickly.

Usually, the data to be collected, for example concerning traffic signs, are already known in the planning phase of a vehicle project for such methods. Thus, the vehicles of the vehicle fleet are already preconfigured for the data collection on specific data. However, the configuration of all vehicles in a vehicle fleet is not very efficient in practice. For example, it may be necessary to capture only traffic signs relating to a particular region. The data of the vehicles, which in turn evaluate traffic signs from their environment that are not in the desired region, are then unnecessarily transmitted to the control center. Among others, energy and data volume is wasted.

It has also been shown that a predetermined and fixed data extraction is not future-oriented and sufficiently flexible. In particular, it is difficult to predict which data will be needed in the future as a basis for developing new functions in vehicles, for improving the quality of components and/or vehicles, for monitoring maintenance measures or repair measures. At the same time, however, a function-specific data extraction makes sense, since a transmission of all data that the vehicle receives through its sensors to the responsible control center would require enormous technical effort and an excessively high volume of data for transmission. Thus, a configurable, function-specific data extraction from the vehicles of the vehicle fleet would be preferable.

Such a method is known from the DE 195 13 640 A1, which relates to a method for reducing a data volume of vehicle data to be transmitted from vehicles of a vehicle fleet, in particular a sampling vehicle fleet, which contain information about the operating state and/or the surroundings of the vehicles, and position data which contain information about the position of the vehicle in a predetermined coordinate system each at a given time, after detecting the resulting vehicle and position data in the vehicle for the wireless transmission/communication of vehicle and position data to a control center. For the vehicles of the vehicle fleet, it is specified which of the resulting vehicle and position data are to be transmitted to the control center under which conditions. The defaults can be communicated wirelessly by a predefined device outside the vehicles.

A further method for transmitting at least one piece of traffic information determining the current traffic state of a route section to a control center is known from DE 10 2011 009 812 B3.

A disadvantage of the known methods is that the data to be exchanged between the vehicle and the control center can still become relatively extensive and that the computational effort within the vehicles for implementing the known methods is relatively high.

BRIEF DESCRIPTION OF DRAWINGS/FIGURES

DETAILED DESCRIPTION

Figure 1:
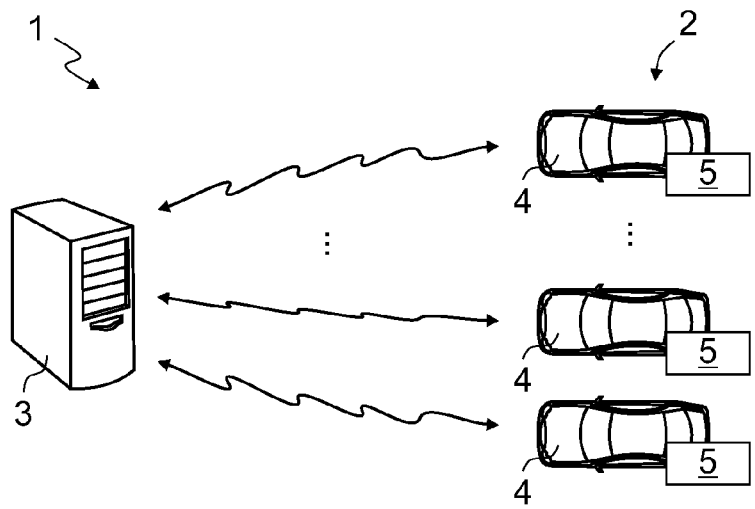
FIG. 1 illustrates a data collection system, in accordance with some embodiments.

It is an object of the present invention to provide a method for data collection by means of a vehicle fleet and a control center, in which the amount of data to be transmitted is low. It is also an object of the present invention to provide a system for data collection, comprising a vehicle fleet and a control center, in order to be able to carry out an advantageous data collection by means of the vehicle fleet.

As described herein, the object of the method and the system is achieved by the features mentioned in the independent claims.

In some embodiments, the method for data collection by means of a vehicle fleet and a control center is provided in which the control center generates data collection tasks for the data acquisition and transmits at least one of the data collection tasks to at least one vehicle of the vehicle fleet, wherein the vehicles of the vehicle fleet can be identified by means of vehicle attributes.

The method as described herein is suitable for vehicles of all kinds, i.e., for land vehicles, watercraft, aircraft, as well as spacecraft. However, the embodiments are discussed in this disclosure with reference to a motor vehicle.

In some embodiments, the control center may be any center independent of the vehicle; in particular but not exclusively one or more external servers or server devices, service vehicles or other further vehicles, up to diagnostic devices. However, embodiments are discussed in this disclosure for a method for data collection by means of a vehicle fleet and an external server device.

The control center may also be referred to as a "backend" and the vehicle as a "frontend" regarding data collection.

The communication between the vehicle fleet or vehicles of the vehicle fleet and the control center can be provided wirelessly, in particular based on a wireless standard, or wired.

In some embodiments, it is provided that the control center associates each data collection task with an objective and that the vehicle attributes of the vehicles registered at the control center are compared with the objectives of the data collection tasks, whereupon, when the objective of one of the data collection tasks matches the vehicle attributes of one of the vehicles, the corresponding collection task is transmitted to the corresponding vehicle, whereupon a data collection device of the vehicle acquires task-specific data and transmits them to the control center.

The data collection task thus contains at least a description of the data to be derived or to be acquired from the vehicle.

Accordingly, the aforementioned objective includes information about which of the data collection tasks are intended for particular vehicles characterized by corresponding vehicle attributes. In the simplest case, the objective can thus have a list of all vehicle attributes of the vehicles for which the corresponding data collection task is applicable. When comparing the objective with the vehicle attributes, it is thus checked whether or not a data collection task is provided for a vehicle with the corresponding vehicle attributes.

In some embodiments, the transmission of the data collection tasks and/or the comparison of the objectives with the vehicle attributes of the vehicles can be carried out after a logging in of the vehicle at the control center, for example, after the start-up of the vehicle. The transmission of the data collection tasks and/or the comparison of the objectives with the vehicle attributes can, however, basically be triggered at any time when the corresponding vehicle is connected to the control center. For example, a data collection catalog may change for the data acquisition from the side of the control center, wherein data collection tasks may be modified or provided in the future for vehicles with different vehicle attributes. In this case, the reconciliation can be carried out again and the data collection tasks can then be redistributed to the corresponding vehicles of the vehicle fleet.

Accordingly, the tasks for data collection are distributed on a vehicle-specific basis. The data collection tasks are created in the control center and distributed by the objectives on the basis of the vehicle attributes in a vehicle specific manner. Thus, when a vehicle logs in at the control center, it may be provided that all data collection tasks are determined and transmitted in the control center on the basis of the vehicle identification data, in which the objective and the currently existing vehicle attributes match or fit together.

In some embodiments, only vehicles of the vehicle fleet which are relevant for a current data acquisition receive the measurement tasks or data collection tasks. By doing so, the amount of vehicles that transmit data, and thus the resulting transmission costs, is limited to the essentials.

Compared with the prior art, however, the method according to the various embodiments as described herein provide a number of further advantages. For example, the computational load within the vehicles may be significantly reduced because the decision as to whether and what data to capture is not made by the vehicles themselves, but by the control center. Since the comparison of the objectives with the vehicle attributes takes place on the side of the control center, a vehicle does not have to save all the data collection tasks and check for themselves whether, for example, the vehicle position requires data collection according to one of the data collection tasks, taking into account the respective objective.

In particular, therefore, the data load can also be reduced by the fact that not all vehicles of the vehicle fleet must receive, process and store all data collection tasks and objectives.

In some embodiments, a provision can be made for a vehicle, after logging in at the control center, to transmit at least one of the vehicle attributes of the vehicle to the control center, after which the control center uses the at least one vehicle attribute to compare with the objectives of the data collection tasks.

In some embodiments, the vehicle may not be clearly identifiable, since the distribution of the vehicle attributes within the vehicle fleet may possibly occur identically several times. However, an unambiguous identification of a vehicle is also not absolutely necessary since, according to the invention, it is only important to transmit the corresponding data collection tasks to vehicles whose vehicle attributes correspond to corresponding objectives of data collection tasks. The information to be transmitted is therefore limited to the essentials.

In some embodiments, it may additionally or alternatively be provided that a vehicle transmits a vehicle-specific identifier to the control center, after logging in at the control center, whereupon the control center reads the vehicle attributes based on the vehicle-specific identifier from a vehicle database of the control center and then uses said attributes to match the objectives of the data collection tasks.

The vehicle-specific identifier can be, for example, a vehicle identification number or a similar code, via which the vehicle can be uniquely identified. However, an identifier can also be provided that does not clearly identify the vehicle, but only allows a clear assignment of vehicle attributes. For example, so-called primary equipment codes (PR codes) for identifying the vehicle equipment or the installed components can be transmitted to the control center. Through the use of vehicle-specific identifiers, the amount of data to be transferred from the vehicle to the control center can be further reduced, since now a complete list of vehicle attributes no longer needs to be transmitted.

In some embodiments, it may further be provided that the vehicle attributes are a vehicle equipment, a vehicle position, a vehicle property, a vehicle condition, a vehicle type, a vehicle prioritization and/or driver information.

The vehicle position may in particular be a global position information, for example, determined by a global navigation satellite system, in particular a GPS system or Galileo system, and/or a relative position, for example a distance to a reference point, to another vehicle and/or to a relative position on a road, etc.

A vehicle characteristic may be, for example, the vehicle weight, the vehicle dimensions and/or the vehicle color, etc.

A vehicle state may be, for example, an operating state, a driving situation, a quality condition and/or the age of the vehicle.

The data collection tasks may also be distributed based on vehicle attributes pertaining to the vehicle type. In this case, for example, a distinction can be made between a privately operated motor vehicle, a commercially operated motor vehicle, a lorry or a truck, an emergency vehicle and/or a public transport vehicle.

In some embodiments, the vehicle attributes may relate to a vehicle prioritization. For example, data collection tasks can be prioritized for certain vehicles that have proven to be particularly revealing, for example, in a previous data collection, or from which, based on further background information, a particularly fast and/or high-quality data collection is to be expected.

In some embodiments, vehicle attributes may also relate to driver information or personalized attributes. For example, data collection tasks can be distributed individually only to vehicles that are operated, for example, by drivers of a certain age.

In some embodiments, it can be provided that the objective is a logical combination of vehicle attributes.

In some embodiments, vehicle attributes may be linked by operations of Boolean algebra (AND/OR/NOT).

In some embodiments, it may also be provided that the data collection tasks relate to the driving dynamics of the vehicle, state information of the vehicle, fault memory information of the vehicle, maintenance information of the vehicle and/or surroundings information of the vehicle.

With regard to the driving dynamics of the vehicle, the data collection tasks may concern, for example, the current position, the distance traveled, the time in motion, the time in the state, the speed and/or the acceleration.

The environment information of the vehicle may include, for example, image information, sound information and/or video information and/or data which were already evaluated or classified, such as traffic signs.

By way of non-limiting example, it can thus be provided that a data collection task relates to the detection of traffic signs and their global position, wherein the data collection task is assigned, specifically, for example, to vehicles in Ingolstadt, Germany.

In some embodiments, in the case of a suspected faulty behavior of a transmission of the vehicle, for example, in conjunction with a specific configuration and/or a specific engine type, a corresponding data collection task for collecting statistically relevant data can be transmitted to the corresponding vehicles with the relevant equipment.

In some embodiments, it can be provided that the data collection device of the vehicle acquires the data from at least one vehicle bus, in particular from a controller area network (CAN) bus, a local interconnect network (LIN) bus and/or a FlexRay bus.

By way of non-limiting example, in some embodiments, it may be provided that the data collection device of the vehicle acquires the data by using vehicle-specific sensors.

For example, if sensors and/or computing capacity already present in the vehicle for the method are to be used, the data can be conveniently read out or recorded from one of the already existing vehicle buses. However, data collection by using in-vehicle sensors may be more flexible.

In some embodiments, an evaluation of the task-specific data collected by an analysis facility of the control center is carried out. However, the data can only be stored in the control center.

The acquired data are preferably transmitted as raw data to the control center and stored there or optionally further processed or analyzed there. However, the data can also be already preprocessed, for example by the vehicle.

In some embodiments, a system for data collection by means of a vehicle fleet, comprising a vehicle fleet and a control center is disclosed. The control center may be arranged to create data collection tasks for the data collection and to transmit at least one of the data collection tasks to at least one vehicle of the vehicle fleet, wherein the vehicles of the vehicle fleet have vehicle attributes for identification. Each data collection task may be linked to at least one objective by the control center, and the control center may be arranged to compare the vehicle attributes of the vehicles logged in at the control center with the objectives of the data collection tasks when the objective of one of the data collection tasks matches the vehicle attributes of one of the vehicles, to transmit the corresponding collection task to the corresponding vehicle, and wherein a data collection device of the vehicle is set to detect task-specific data to a data collection task and to transmit them to the control center.

Features and advantages of the method in accordance with the embodiments as described herein can also be used for the system.

An exemplary embodiment of the present disclosure is discussed below with reference to the drawings.

FIG. 1 illustrates a data collection system, in accordance with some embodiments. FIG. 1 shows a system 1 for data collection, comprising a vehicle fleet 2 and a control center 3. The vehicle fleet 2 comprises a plurality of vehicles 4, which are described in the embodiment above as motor vehicles. The vehicles 4 can be identified via vehicle attributes 5. The transmission between the vehicles 4 and the control center 3, which is, for example, a server device consisting of one or more servers, is pictorially indicated in the exemplary embodiment as wireless transmission/communication. The details can be found in FIG. 2 described below.

Figure 2:
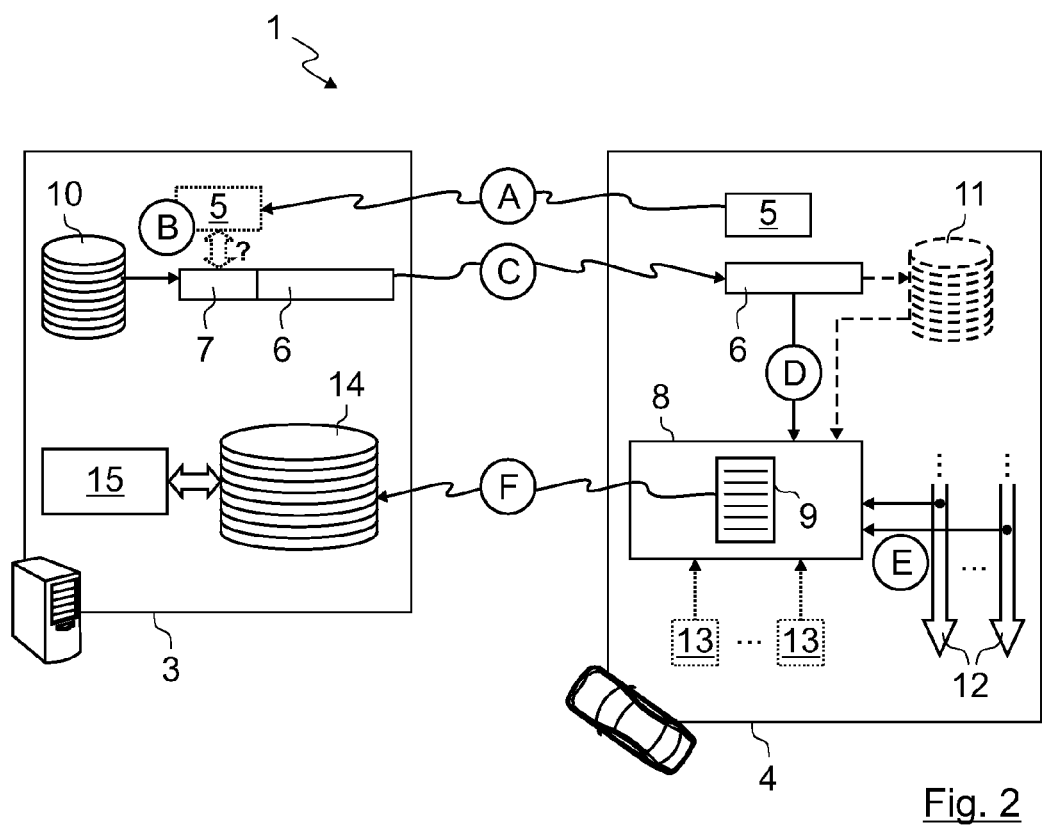
FIG. 2 illustrates a schematic representation of the method for data collection, in accordance with some embodiments.

FIG. 2 illustrates a schematic representation of the method for data collection, in accordance with some embodiments. In FIG. 2, the system 1 and the method for data collection by means of a vehicle fleet 2 and a control center 3 are shown in more detail. For simplicity, the process is depicted within a single vehicle 4 of the vehicle fleet 2.

In accordance with some embodiments, the control center 3 creates a plurality of data collection tasks 6 for the data collection and transmits at least one of the data collection tasks 6 to at least one vehicle 4 of the vehicle fleet 2, the vehicles 4, as already mentioned, being identifiable by means of vehicle attributes 5.

A vehicle attribute 5 may be, for example, a vehicle equipment, a vehicle position, a vehicle property, a vehicle condition, a vehicle type, a vehicle prioritization and/or driver information.

In accordance with some embodiments, the control center 3 links each data collection task 6 with an objective 7, wherein the vehicle attributes 5 of the vehicles 4 logged in to the control center 3 are compared with the objectives 7 of the data collection tasks 6, after which, if the objective 7 of one of the data collection tasks 6 matches the vehicle attributes 5 of one of the vehicles 4, the corresponding data collection task 6 is transmitted to the corresponding vehicle 4, after which a data collection device 8 in the vehicle 4 acquires task-specific data 9 and transmits it to the control center 3.

The following is an exemplary process for the method according to some embodiments as described above for a better understanding. The process is merely illustrative and not restrictive.

In accordance with some embodiments, in a first step A, it may be provided that a vehicle 4 transmits at least one of its vehicle attributes 5, preferably all vehicle attributes 5, to the control center 3 after logging in at the control center 3. Alternatively or additionally—not shown in the exemplary embodiment—a vehicle 4 can also transmit a vehicle-specific identifier to the control center 3 after logging in at the control center 3, after which the control center 3 reads the vehicle attributes 5, based on the vehicle-specific identifier, from a vehicle database of the control center 3 and then uses them for comparison with the objectives 7 of the data collection tasks 6.

Subsequent to the first step A, the control center 3 in a second step B can use the at least one vehicle attribute 5 for comparison with the objectives 7 of the data collection tasks 6 (shown in dashed lines in FIG. 2).

The objective 7 can preferably be a logical combination of vehicle attributes 5 or a list of eligible vehicle attributes 5. For example, it can be provided that the control center 3, after logging in of a vehicle 4 at the control center 3 or after its transmission of its vehicle attributes 5, sequentially searches all data collection tasks 6, which may be stored, for example, in a corresponding task memory 10 within the control center 3, or in parallel and determines the eligible data collection tasks 6 for the registered vehicle 4 by a comparison between objective 7 and vehicle attributes 5.

If the control center 3 has determined a data collection task 6 whose objective 7 matches the vehicle 4 or its vehicle attributes 5, the control center 3 can transmit the corresponding data collection task 6 to the vehicle 4 in a third step C.

In a fourth step D, the data collection task 6 can be transferred within the vehicle 4 to the data collection device 8 for further processing. By way of non-limiting example, the data collection task 6, shown in dashed lines in the exemplary embodiment, can be stored in a task memory 11 of the vehicle 4 and can be read by the data collection device 8 of the vehicle 4 from said memory. Accordingly, a provision can be made for a vehicle 4 to process any number of data collection tasks 6, sequentially or in parallel.

In a subsequent step E, the data collection device 8 of the vehicle 4 can capture the task-specific data 9. For this purpose, the data collection device 8 of the vehicle 4 can acquire the data 9, for example from at least one vehicle bus 12, in particular from the CAN bus, the LIN bus and/or the FlexRay bus. By way of non-limiting example, as shown in dashed lines, the data collection device 8 of the vehicle 4 is able to detect the data 9 by using on-board sensors 13.

The data collection tasks 6 may include, for example, the driving dynamics of the vehicle 4 (e.g., position and speed), status information of the vehicle 4 (e.g., maintenance status and age), error storage information of the vehicle 4, maintenance information of the vehicle 4 (e.g., license plate number of the automotive workshop last visited and work last performed) and/or environmental information of the vehicle 4 (e.g., traffic signs).

The data 9 thus collected can be transmitted back to the control center 3 by the data collection device 8 or by the vehicle 4 in a concluding step F. The data 9 can then be analyzed directly or, as shown in the exemplary embodiment, stored in a data memory 14 of the control center 3 and processed by a data analysis device 15 if necessary.

The invention claimed is:

1. A method for data collection having reduced data transmission between a server of a control center and a vehicle fleet, wherein the vehicle fleet comprises a plurality of vehicles, wherein the data collection is achieved using an assignment of at least one data collection task of a plurality of data collection tasks to a vehicle of the plurality of vehicles, and wherein the vehicle comprises a data collection device configured for the at least one data collection task, the method comprising:
   identifying, at the server of the control center, the at least one data collection task, wherein the at least one data collection task is associated with collection of information comprising collecting information of surroundings around the vehicle and the at least one data collection task comprises detection of traffic signs and a corresponding global position, driving dynamics of the vehicle, state information of the vehicle, fault memory information of the vehicle, maintenance information of the vehicle or surroundings information of the vehicle;
   receiving, at the server of the control center from the vehicle, an identifier of the vehicle;
   accessing, at the server of the control center, vehicle attributes based on the identifier of the vehicle, wherein the vehicle attributes are stored in a database of the control center;
   registering, at the server of the control center, the vehicle attributes of the vehicle with the vehicle, wherein the vehicle attributes comprise at least one of a vehicle equipment, a vehicle location, a vehicle type, a vehicle priority, a vehicle driver information, or a vehicle characteristic;
   associating, at the server of the control center, the at least one data collection task with required vehicle attributes with an associated objective, wherein the associated objective is characterized by corresponding vehicle attributes;
   based on the association of the at least one data collection task with the required vehicle attributes, comparing, at the server of the control center, the required vehicle attributes with the vehicle attributes for a match;
   in response to the comparison indicating the match between the required vehicle attributes and the vehicle attributes, transmitting, from the server of the control center to the vehicle, the at least one data collection task to collect the information associated with the at least one data collection task using the data collection device of the vehicle; and
   receiving, at the server of the control center from the vehicle, the information associated with the at least one data collection task assigned to the vehicle, wherein the information is collected using the data collection device of the vehicle,
   analyzing, at the server control center from the vehicle, the information collected;
   wherein the data collection device comprises a sensor,
   wherein the collecting information of the surroundings around the vehicle comprises image information, sound information, or video information, and
   detecting, at the server of the control center, a global position of an object based on the collection information of the surroundings of the vehicle, wherein the object is located in the surrounding of the vehicle.

2. The method of claim 1, further comprising receiving, at the control center from the vehicle, at least one vehicle attribute of the vehicle attributes of the vehicle after logging in of the vehicle at the control center, wherein the logging in of the vehicle comprises turning on the vehicle.

3. The method of claim 1, wherein the objective of the at least one data collection task comprises combinations of the vehicle attributes.

4. The method of claim 1, wherein the data collection device of the vehicle further comprises at least one of a controller area network (CAN) bus, a local interconnect network (LIN) bus, or a FlexRay bus.

5. The method of claim 1, wherein the server of the control center and the vehicle communicate with each other using wireless communication.

6. A system for data collection having reduced data transmission between a server of a control center and a vehicle fleet, wherein the data collection is achieved using an assignment of at least one data collection task of a plurality of data collection tasks to a vehicle of a plurality of vehicles, and wherein the vehicle comprises a data collection device configured for the at least one data collection task, the system comprising:
   the vehicle fleet comprising the plurality of vehicles; and
   the control center, wherein the server of the control center is configured to perform operations comprising:
   identifying the at least one data collection task, wherein the at least one data collection task is associated with collection of information comprising collecting information of surroundings around the vehicle and the at least one data collection task comprises detection of traffic signs and a corresponding global position, driving dynamics of the vehicle, state information of the vehicle, fault memory information of the vehicle, maintenance information of the vehicle or surroundings information of the vehicle;
   receiving, from the vehicle, an identifier of the vehicle;

accessing vehicle attributes based on the identifier of the vehicle, wherein the vehicle attributes are stored in a database of the control center;

registering the vehicle attributes of the vehicle with the vehicle, wherein the vehicle attributes comprise at least one of a vehicle equipment, a vehicle location, a vehicle type, a vehicle priority, a vehicle driver information, or a vehicle characteristic;

associating the at least one data collection task with required vehicle attributes with an associated objective, wherein the associated objective is characterized by corresponding vehicle attributes;

based on the association of the at least one data collection task with the required vehicle attributes, comparing the required vehicle attributes with the vehicle attributes for a match;

in response to the comparison indicating the match between the required vehicle attributes and the vehicle attributes, transmitting, from the server of the control center to the vehicle, the at least one data collection task collect the information associated with the at least one data collection task using the data collection device of the vehicle; and receiving, from the vehicle, the information associated with the at least one data collection task assigned to the vehicle, wherein the information is collected using the data collection device of the vehicle, analyzing the information collected;

wherein the data collection device comprises a sensor, wherein the collecting information of the surroundings around the vehicle comprises image information, sound information, or video information, and detecting a global position of an object based on the collection information of the surroundings of the vehicle, wherein the object is located in the surrounding of the vehicle.

7. The system of claim 6, wherein the operations further comprise receiving, from the vehicle, at least one vehicle attribute of the vehicle attributes of the vehicle after logging in of the vehicle at the control center, wherein the logging in of the vehicle comprises turning on the vehicle.

8. The system of claim 6, wherein the objective of the at least one data collection task comprises combinations of the vehicle attributes.

9. The system of claim 6, wherein the data collection device of the vehicle further comprises at least one of a controller area network (CAN) bus, a local interconnect network (LIN) bus, or a FlexRay bus.

10. The system of claim 6, wherein the server of the control center and the vehicle communicate with each other using wireless communication.

11. The method of claim 1, wherein the object is a traffic sign.

12. The system of claim 6, wherein the object is a traffic sign.

* * * * *